Sept. 8, 1953 F. A. WISSEL 2,651,675

PLURAL TIME CONSTANT CIRCUITS FOR NOISE IMMUNITY

Filed June 8, 1950

INVENTOR.
FRANCIS A. WISSEL
BY Alden D. Redfield
ATTORNEY.

Patented Sept. 8, 1953

2,651,675

UNITED STATES PATENT OFFICE 2,651,675

PLURAL TIME CONSTANT CIRCUITS FOR NOISE IMMUNITY

Francis A. Wissel, Cincinnati, Ohio, assignor to Avco Manufacturing Corporation, Cincinnati, Ohio, a corporation of Delaware Application June 8, 1950, Serial No. 166,810

5 Claims. (Cl. 178—7.3)

The present invention relates to television peak signal rectification circuits. More specifically the present invention relates to television system plural time constant peak rectification circuits having effectively high rectification efficiency along with good immunity to high amplitude long duration noise pulses.

Peak rectification is used in television receivers for such functions as sync separation, clamping and automatic gain control. For example, in Fig. 1 and Fig. 2, I have illustrated a prior art sync separator circuit and a conventional prior art automatic gain control circuit, respectively, both of which are used in present day television receivers.

The synchronizing separator tube 10 of Fig. 1, is shown having an anode 11 connected through resistance 12 to a source of anode potential (B+). Terminal 13 is used for connection to an output circuit, while cathode 14 is shown connected to ground through a bias source 15, which may be a self-bias source or a separate variable potential source as shown. The input terminal 16 is connected through capacitor 17 through resistor 19 to ground and through resistor 20 to a control grid 18. Condenser 17 has a large capacitance and a relatively short time constant charging path because of the low resistance path between grid 18 and ground. However, the discharge path of condenser 17 through resistance 19 may have a relatively long time constant, e. g., in the order of $\frac{1}{20}$ of a second.

When this circuit is used in a television receiver system and a composite picture signal having positive sync pulses is fed between input terminal 16 and ground, condenser 17 absorbs sufficient energy from each sync pulse so as to acquire a charge proportional to the amplitude of the synchronizing pulse peaks thereby clamping the sync peaks to the potential of cathode 14. The long time constant of the discharge path through resistance 19 maintains the charge on condenser 17 for a considerable time, allowing very little discharge during succeeding line period, thereby making it possible to set the cathode bias 15 so that tube 10 clips off and amplifies only the synchronizing pulse peaks, that is, in the absence of noise. When the signal includes noise, condenser 17 rapidly absorbs energy from the high amplitude noise pulses and thus becomes charged to a noise level above the normal horizontal sync pulse peak amplitude. The long discharge or recovery time of condenser 17, as a result, keeps separator tube 10 effectively "blocked" for many horizontal line periods. Recognizing this undesirable factor many prior art circuits compromise the high rectification efficiency of the circuit by reducing the ratio of discharge to charge path resistance. This lowers the efficiency of rectification, which can be defined as the ratio of D. C. output voltage to peak signal voltage.

However, the compromise does increase the amount of noise energy required to overcharge the condenser. Also as another compromise expedient, in other prior art circuits, the capacitance value of condenser 17 has been reduced. This type of compromise undesirably tends to impair the main function of the sync separation circuit, since condenser 17 may then be able to discharge during a horizontal line interval allowing video and pedestal components to appear in the plate circuit of tube 10. Also the difference in duty cycle between the vertical synchronizing pulses and the horizontal synchronizing pulses allows condenser 17 to remain charged to a high potential under influence of the vertical synchronizing pulses, which is equivalent to having a higher efficiency of rectification during this period and a lower efficiency of rectification during horizontal pulse periods, with a resulting variation in the amplitude of the separated signals. It is to be noted that a practical rectifier circuit compromise may include a change in the ratio of discharge to charge path resistance as well as a reduction in condenser capacitance with slightly better results than outlined above. In view of the unsatisfactory nature of the prior art circuits, it would be desirable to provide a rectifier circuit having an overall high rectification efficiency which recognizes the relatively constant amplitude of the received television signal (without noise interference), and which also recognizes the time interval and the duty cycle of the horizontal and vertical synchronizing pulses.

In Fig. 2 a typical prior art AGC rectifier circuit is illustrated which uses a diode 30 connected between ground and condenser 32. Input terminal 31 is connected to the other plate of condenser 32 and a discharge resistor 33 is shunted across diode 30 to complete the AGC circuit.

The main difficulty encountered with typical picture AGC circuits is due to the requirement that their output voltage must measure peak carrier level in order to adequately indicate carrier strength and, as a result, the output voltage cannot vary at a rate fast enough to recover rapidly from noise pulses. The AGC voltage fails to come down to normal after noise has temporarily increased the measured peak carrier level, and this excessive and erroneous AGC bias voltage reduces the controlled signal level thereby interfering with the signal amplitude responsive functions of the receiver including, e. g., sync separation. A fast AGC circuit would eliminate these problems, but if the R-C values are reduced to allow a fast response, the carrier strength can no longer be indicated or measured correctly. Also because of the variation in duty cycle between the vertical sync pulses and the horizontal sync pulses, a fast AGC circuit can interpret the vertical sync pulses as an increase in carrier level because of their increased pulse width and charging period, thereby reducing gain during this period and decreasing the amplitude of the vertical pulses with respect to the other pulses. Actually this places the vertical pulses "in a hole" relative to the horizontal sync pulses and the picture signal components.

In other words, the AGC circuit of Fig. 2 fails to recognize the relatively constant amplitude of a received television signal (without noise interference), and it also fails to "recognize" the time interval or the duty cycle of the horizontal and vertical synchronizing pulses. When the circuit of Fig. 2 is used in a television receiver the designer has the choice between accepting noise interference and using a high rectification efficiency circuit, or discriminating against noise interference with a resulting variation in AGC output potential which gives false information to the circuits controlled by the AGC circuit.

Accordingly, it is an object of the present invention to provide means for taking advantage of the constant nature of the normal television signal in a signal rectification circuit.

It is also an object of the present invention to provide a rectifier circuit for television receivers that recognizes the relatively constant amplitude of the received television signal, and the time interval and duty cycle of the horizontal and vertical sync pulses.

It is a further object of the present invention to provide a rectifier circuit that includes the advantages of a high efficiency rectification system along with discrimination against extraneous noise signals.

Ideally, a rectifier circuit used for sync separation or AGC in a television receiver should be 100% efficient, that is, the stored charge potential should be equal to the signal peak potential and be an accurate measure of signal peak potential. The circuit should not only measure the signal peaks, but it should also discriminate against noise peaks, if there are any. Fortunately, a television picture signal has a relatively constant amplitude, so far as sync pulse peaks are concerned, and the average change in signal amplitude is gradual in lieu of being abrupt. It is because of this desirable factor that conventional high efficiency rectification circuits such as shown in Fig. 1 and Fig. 2 are still used in present day commercial receivers regardless of inherent noise disadvantages. Also, fortunately, the average extraneous noise impulse has a very short duty cycle, and is abruptly rising and falling. It is because of this desirable factor that rapid signal following peak rectifier circuits, or a compromise version of Fig. 1 and Fig. 2, are also used in present date commercial television receivers regardless of inherent poor peak measuring disadvantages.

Recognizing the desirable factors of high efficiency rectification and also the noise immunity of low efficiency rectification, I provide a circuit which draws its advantages from both of these circuits without all of the inherent disadvantage of either circuit. I provide a plural time constant circuit wherein a condenser, which can be called a low energy condenser, is charged up to the peaks of the incoming signal over a short time constant path and not allowed to discharge below a certain predetermined average signal level. I provide a fluctuating bias means which effectively supplies an additional potential in the rectifier circuit and keeps the low energy condenser from discharging to an undesirable level between line signals. The rapid signal following and noise immunity features of short time constant rectification circuits are retained between the peak amplitude level and the relatively constant potential level of the additional bias means, and the advantages of a rectification circuit having a long discharge time constant are retained between the said relatively constant potential level and zero signal potential level. The additional bias source comprises a second time constant circuit having a long time constant discharge path, which means that once it becomes charged to a given potential it maintains that potential for a considerable number of horizontal line periods. To charge the second time constant means, I connect it into the circuit in such a manner that it forms a rapid discharge path for the low energy condenser, storing and maintaining the charge over a relatively long period. In other words, even though the second time constant network or bias component has a relatively long discharge period, as far as the discharge path of the low energy condenser is concerned it offers but little impedance, thereby allowing the low energy rectifying condenser to discharge rapidly to a potential which is equal to the charge potential on the condenser or condensers in the second time constant network. My circuit departs from the teaching of the prior art in that heretofore the advantages of intentionally providing a low impedance discharge path through a charge storage condenser have been ignored, while I utilize this effect to provide novel results. Also prior art circuits have ignored the inherent time factors in the signal to be rectified. My circuit takes full advantage of the constant values of the input signal. For example, I optimize the charge time constant of the initial charge path so as to take full advantage of the duration of the horizontal sync pulse in a television signal. In other words, as will hereinafter be explained, the time constants provided by the branches of my novel circuit are related in a particular manner to certain time intervals occurring in the received television signal.

For a better understanding of the present invention, together with other and further objects, advantages and capabilities thereof, reference is made to the following disclosure and appended claims in connection with the accompanying drawings, in which:

Figures 3, 4:
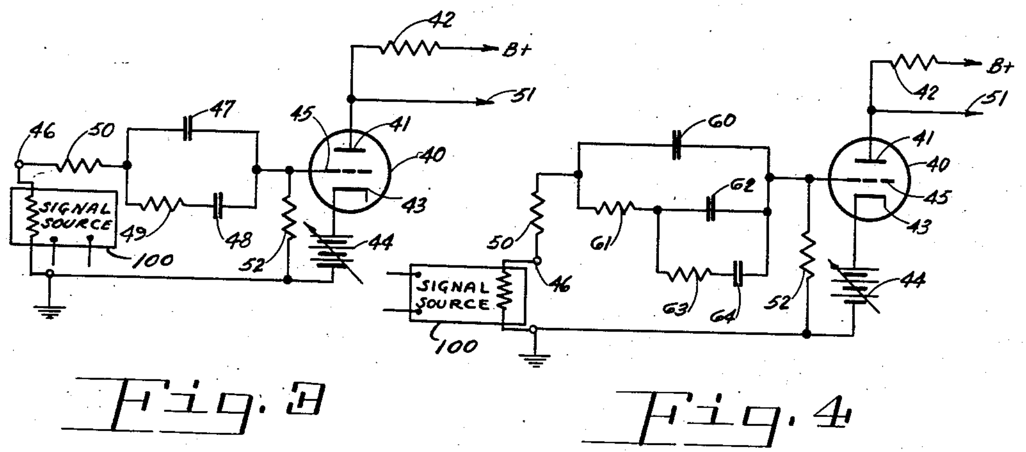
Fig. 3 is a synchronizing separator circuit embodying the present invention.
Fig. 4 is a modification of the circuit Fig. 3, using a triple constant circuit.

In Fig. 3 I have disclosed a pulse separator circuit comprising separator tube 40 having its anode 41 connected through resistance 42 to a source of B+ potential. The cathode 43 of tube 40 is connected to a cathode bias source 44, which may comprise a self-biasing network or a separate potential source as shown. Grid 45 is connected through resistance 52 to ground and also to the ground side of cathode bias source 44. The grid 45 is also connected to input terminal 46 through clipping resistor 50 and a double time constant network, comprising condensers 47 and 48 along with resistor 49. It is to be here noted that terminal 46 is also connected to a signal source, not shown, having a D. C. path to ground.

The circuit of Fig. 3 operates in such a manner as to include the advantages of both long and short time constant rectification circuits. This can be understood by assuming that a positive sync composite television signal is fed from signal source 100 between input terminal 46 and ground, it being desired to separate the sync pulses from the blanking pulse pedestal and video signal component. Condenser 47 has a relatively low resistance charge path, with a time constant in the order of a horizontal sync pulse period or five microseconds, through resistance 50 and grid 45-cathode 43 path to ground. Therefore, condenser 47 rapidly absorbs sufficient energy to lower the potential of its plate connected to grid 45 to a negative potential relative to the other condenser plate by an amount approximately equal to the amplitude of the synchronizing pulse peak, thereby acting to clamp the synchronizing pulse peaks to the potential of cathode 43, as far as the potential on grid 45 is concerned. The cathode bias source 44 is so adjusted as to cut off anode current flow in tube 40 for any grid signal having an amplitude lower than the top of the blanking pulse pedestal. For this reason anode current flows in tube 40 only during synchronizing pulse peaks or when a noise peak having sufficient amplitude is impressed on grid 45. The blanking pulse pedestal components and the video picture components are effectively blocked by the varying bias on condenser 47. As for discharge, in the absence of a synchronizing pulse, condenser 47 has two discharge paths; one discharge path being through high resistance grid resistor 52, and the other and primary discharge path, having a time constant of the order of line frequency or sixty microseconds, being through resistance 49 and condenser 48. Thus, it can be seen that condenser 47 will discharge primarily through its shorter time constant path, which is the path including resistance 49 and condenser 48, during each line period, until the charges on condensers 47 and 48 are equal. Since condenser 48 has a much larger capacitance than condenser 47 a number of discharge periods are necessary before condenser 48 attains a level charge, that is until the charge rate of condenser 48 is equal to the discharge rate. Ultimately the charge across condenser 48 rises to such a value that condenser 47 can only discharge a relatively small amount and condenser 48 needs only this small discharge current from condenser 47 to maintain a relatively stable charged condition, because the time constant of the discharge path of condenser 48 through the signal source, connected between terminal 46 and ground, and resistances 49, 50 and 52 is of the order of the field frequency or about one-sixtieth of a second. It can now be seen that the charge on condenser 48 constitutes a varying normal bias potential, which is a function of the amplitude of the incoming synchronizing pulses and which duplicates the desirable discharge functions of a long time constant rectification circuit. It will also be seen that since condenser 47 has a rapid charge and discharge rate, the charge variation across condenser 47 duplicates the desirable functions of a short time constant rectification circuit.

After condenser 48 becomes charged to its normal level, that is, when the coulombs stored per line period are equal to the coulombs discharged per line period, the potential across condenser 47 varies only between the upper limit of the sync peak potential level and a lower potential limit held by condenser 48. The rapid charge and discharge of condenser 47 between these limits provides the main noise immunity factor of a short time constant rectification circuit because even though a noise peak impulse does charge up condenser 47 to an abnormal peak, the discharge time constant, which is of the order of a line period, allows condenser 47 to come back to its normal charged condition or a charge which is equal to the charge across condenser 48. By selecting the charge path time constant of condenser 47 so as to have a charge period similar to the duration of a horizontal sync pulse, I provide optimum noise discrimination. By this I mean that, a noise pulse of shorter duration than a horizontal sync pulse fails to peak charge condenser 47 and, therefore, also fails to store a network charge which is proportional to that stored by the sync pulse.

Noise pulses of longer duration than a horizontal sync pulse, however, do peak charge condenser 47 but they do not store a charge on condenser 47 which is proportional to their duration. The noise immunity advantage of a short time constant rectification circuit is therefore retained without the disadvantage of allowing picture pedestal, and vertical sync pulse components to appear in the plate circuit of separator tube 40. The amplitude discrimination is primarily due to the charge across condenser 48 which forms a base potential, below which condenser 47 cannot discharge, and which is of sufficient amplitude to "blank out" undesired low amplitude portions of the input signal so that they have no effect on the plate current of separator tube 40. Also, since condenser 48 receives its main charge component from the discharge of condenser 47 over a full line period, it can be seen that the vertical sync pulses will have little effect on the charge on condenser 48, regardless of the fact that they have a longer duty cycle than the horizontal sync pulses and the equalizing pulses. As has been explained, my complete rectification circuit has very good noise immunity as well as the peak measuring advantages of a high efficiency rectification system with condenser 47 contributing the rapid peak following and rapid discharge actions, and condenser 48 contributing the long duration charge storage action.

In Fig. 4 I show another embodiment of my invention comprising a triple time constant rectification circuit. Circuit elements which are the equivalent of those shown in Fig. 3 have been given like reference numerals. The triple time constant network includes condenser 60, and parallel connected resistance 61 and condenser 62. Across condenser 62 is connected a long time constant circuit, comprising resistance 63 and condenser 64. This complete network functions in a manner similar to the circuit of Fig. 3 with the exception that the normal network potential is mainly stored in condenser 64. The discharge time constant of condenser 64, through resistance 52, 63, 61, 50 and the resistance of signal source 100 can be set for a relatively long period, e. g., a full second, making it possible to shorten the discharge time of condensers 60 and 62, thereby adding to the noise immunity of the circuit. The same type of rectification circuit with a plural time constant network can be used for increasing the accuracy of an AGC system as will hereinafter be described.

Figure 5:
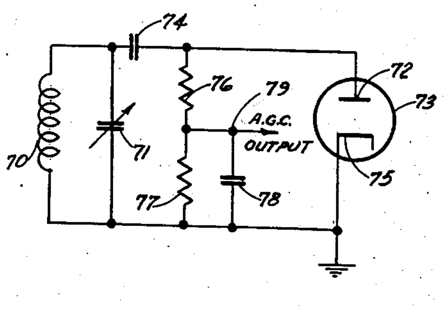
Fig. 5 is an AGC circuit of the shunt type which embodies the present invention.
Figure 6:
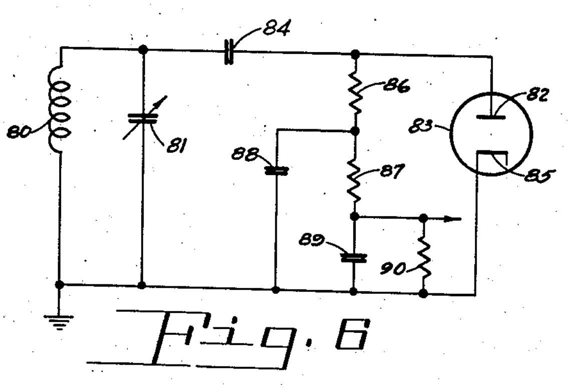
Fig. 6 is another shunt type AGC circuit embodying the present invention.

In Figs. 5 and 6, I have shown two shunt type AGC rectifier circuits using a double time constant network and a triple time constant network, respectively. The shunt type AGC circuit of Fig. 5 includes a coupling network for providing signals from the last stage of I. F. amplification comprising an inductance 70 which is tuned by condenser 71 to the I. F. frequency. One terminal of the coupling network is connected to the anode 72 of diode 73 through condenser 74. The cathode 75 of diode 73 is connected to ground and the grounded terminal of the I. F. coupling network. Condenser 74 is also connected to the ungrounded terminal of a time constant network comprising resistances 76 and 77 and condenser 78. The AGC output signal is taken across condenser 78 between terminal 79 and ground.

Figure 1:
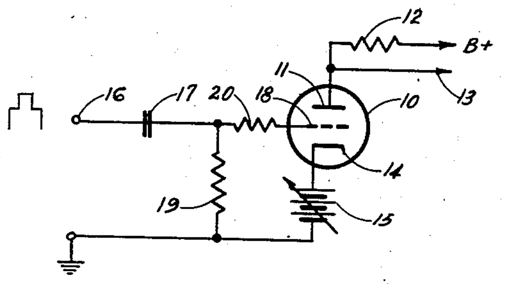
Figs. 1 and 2 are illustrative of the prior art.
Figure 2:
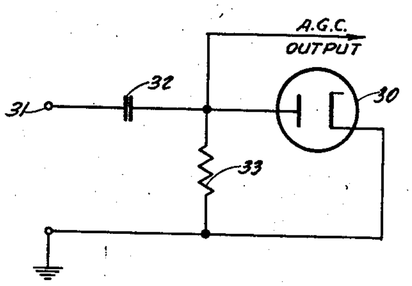

This circuit functions in a manner similar to the prior art AGC circuit shown in Fig. 2 but with all the advantages of my improved rectification circuit previously described and illustrated in Fig. 3. AGC circuits, as is stated above, must measure peak carrier level in order to adequately indicate carrier strength and, as a result prior art circuits have undesirably comprised the measuring quality of the rectification circuit in order to minimize the effect from noise impulses. In my circuit the time constant of the discharge path of condenser 74 is of the order of a single horizontal line period and the discharge time constant of condenser 78 through resistance 77 is of the order of a full field period or 1/60 of a second. Again condenser 78 which stores the main part of the charge is primarily charged by the discharge of condenser 74 through inductance 70 and resistance 76. High amplitude noise pulses which charge up condenser 74 have little effect on the charge carried by condenser 78, since they are usually intermittent and of short duration and since individually they store relatively few of the coulombs proportionately, which condenser 74 passes on to condenser 78. Also, resistance 76 blocks the direct charge path to condenser 78 so that even pulses of relatively long duration cannot directly charge condenser 78, except to a slight extent. This same blocking function also is supplied by resistances 61 and 63 in Fig. 4. In other words, the rectifier circuit of Fig. 5 quickly recovers from the influence of a noise impulse because of the relatively short discharge time constant of condenser 74 and also the same rectifier circuit is able to adequately measure the peak carrier level because of the long time constant of the discharge path for condenser 78.

In Fig. 6 I show a second shunt type picture AGC circuit which differs from the circuit of Fig. 5 in that a triple time constant network is used in lieu of a double time constant network. The tuned coupling network 80—81 has one terminal connected to ground and the other terminal connected to a plate of condenser 84. The other plate of condenser 84 is connected to anode 82 of diode 83. Cathode 85 is connected to the said one terminal of network 80—81 and ground. The diode 83 is shunted by series connected resistances 86, 87, and 90, while condenser 89, is connected across 90, and condenser 88 is connected across resistances 87 and 90.

The time constant network in Fig. 6 operates in a manner similar to the triple time constant network of Fig. 4, in that condenser 84 rapidly charges up to a value equal to the input pulse peaks and discharges through condensers 88 and 89. Since the discharge path through condenser 88 is of lower resistance than the discharge path through condenser 89, the majority of the charge on condenser 84 is first stored on condenser 88. Condenser 88 then in turn discharges into condenser 89. After a number of discharge cycles of condenser 84 have been completed, the potential across the network stabilizes out and the main network charge is stored in condenser 89, with an intermediate amount of charge stored in condenser 88. Here again, the short time constant charging path for condenser 84 dissipates the majority of the noise pulse energy. The subsequent filtering of condensers 88 and 89, each of these condensers being progressively larger than condenser 84, makes the output AGC potential relatively free of noise interference. The long time constant discharge path of condenser 89 correctly measures signal variations in a manner similar to a high efficiency rectification circuit.

While I do not desire to be limited to any specific circuit parameters, such parameters bearing in accordance with individual circuit requirements, the following circuit values have been found entirely satisfactory in one successive embodiment of the invention, in accordance with Fig. 3:

| | |
|---|---|
| Resistance: | |
| 42 | 15,000 ohms |
| 49 | 120,000 ohms |
| 50 | 6800 ohms |
| 52 | 1.2 megohms |
| Condenser: | |
| 47 | 500 micromicrofarads |
| 48 | .02 microfarad |
| Tube 45 | 12AU7 (one section) |

While there has been shown and described what is at present considered the preferred embodiment of the present invention, it will be obvious to those skilled in the art that various changes and modifications may be made therein without departing from the appended claims.

Having thus described my invention, I claim:

1. In a television receiver sync separation circuit the combination comprising a composite source of television signals including picture components and blacker than black positive going sync components, a first charging circuit comprising a first capacitor coupled across said signal source through a resistance path which includes the grid-cathode path of an amplifier threshold biased at substantially the black level of said picture components, said charging circuit having a time constant on the order of the duration of a horizontal sync pulse, discharge means coupled directly across said first capacitor to form a circuit having a time constant on the order of a scanning line period, said discharge means comprising a first resistor and a series connected second capacitor having a larger capacitance value than said first capacitor, and a discharge resistor coupled cross said grid-cathode path to form a discharge path through said source for said first and second capacitors, said discharge resistor having a larger resistance value than said first resistor and forming a time constant with said first capacitor on the order of a field period, whereby said discharge means discharges said first capacitor substantially between the upper potential limit of peak signal charge on said first capacitor and a blocking potential lower limit established by the charge on said second capacitor.

2. In a television receiver sync separation circuit the combination comprising a composite source of television signals including picture components and blacker than black positive going sync components, a first time constant charging circuit comprising a first capacitor coupled across said signal source through a resistance path which includes the grid-cathode path of an amplifier threshold biased at substantially the black level of said picture components, discharge means coupled directly across said first capacitor to form a second time constant circuit having a time constant greater than the time constant of said first time constant circuit, said discharge means comprising a first resistor and a series connected second capacitor having a larger capacitance value than said first capacitor, and a discharge resistor coupled across said grid cathode path to form a discharge path through said source for said first and second capacitors, said discharge resistor having a larger resistance value than said first resistor and forming a time constant with said first capacitor which is larger than the time constant of said second time constant circuit, whereby said discharge means discharges said first capacitor substantially between the upper potential limit of peak signal charge on said first capacitor and a blocking potential lower limit established by the charge on said second capacitor.

3. In a television receiver sync separation circuit the combination comprising a composite source of television signals including picture components and blacker than black positive going sync components, a first time constant charging circuit comprising a first capacitor coupled across said signal source through a resistance path which includes a unilateral conducting device threshold biased at substantially the black level of said picture components, discharge means coupled directly across said first capacitor to form a second time constant circuit having a time constant greater than the time constant of said first time constant circuit, said discharge means comprising a first resistor and a series connected second capacitor having a larger capacitance value than said first capacitor, and a discharge resistor coupled across said unilateral conducting device to form a discharge path through said source for said first and second capacitors, said discharge resistor having a larger resistance value than said first resistor and forming a time constant with said first capacitor which is longer than the time constant of said second time constant circuit, whereby said discharge means discharges said first capacitor substantially between the upper potential limit of peak signal charge on said first capacitor and a blocking potential lower limit established by the charge on said second capacitor.

4. In a television receiver sync separation circuit the combination comprising a composite source of television signals including picture components and blacker than black positive going sync components; a first time constant circuit comprising a first capacitor coupled across said signal source through a resistance path which includes the grid-cathode path of an amplifier threshold biased at substantially the black level of said picture components; discharge means coupled directly across said first capacitor to form a second time constant circuit having a time constant greater than the time constant of said first time constant circuit; said discharge means comprising a first resistor and a series connected second capacitor having a larger capacitance value than said first capacitor, and a second resistor and third capacitor coupled directly across said second capacitor, to form a third time constant circuit with said second capacitor having a time constant greater than the time constant of said second time constant circuit, said third capacitor having a larger capacitance value than said second capacitor; and a discharge resistor coupled across said grid-cathode path to form a discharge path through said source for all of said capacitors; said discharge resistor having a larger resistance value than either of said first or second resistor and forming a discharge time constant with said first capacitor larger than the time constant of the second time constant circuit or the third time constant circuit; whereby said discharge means discharges said first capacitor substantially between the upper potential limit of peak signal charge on said first capacitor and a blocking potential lower limit established by the charge on said second and third capacitors.

5. In a television receiver sync separation circuit the combination comprising a composite source of television signals including picture components and blacker than black positive going sync components; a first time constant charging circuit comprising a first capacitor coupled across said signal source through a resistance path which includes a unilateral conducting device threshold biased at substantially the black level of said picture components; discharge means coupled directly across said first capacitor to form a second time constant circuit having a time constant greater than said first time constant circuit; said discharge means comprising a first resistor and a series connected second capacitor having a larger capacitance value than said first capacitor, and a second resistor and third capacitor coupled directly across said second capacitor to form a third time constant circuit with said second capacitor having a time constant greater than said second time constant circuit; said third capacitor having a larger capacitance value than said second capacitor; and a discharge resistor coupled across said unilateral conducting device to form a discharge path through said source for all of said capacitors; said discharge resistor having a larger resistance value than either of said first or second resistors and forming a time constant with said first capacitor which is larger than the time constant of either the second time constant circuit or the third time constant circuit; whereby said discharge means discharges said first capacitor substantially between the upper potential limit of peak signal charge on said first capacitor and a blocking potential lower limit established by the charge on said second and third capacitors.

FRANCIS A. WISSEL.

References Cited in the file of this patent

UNITED STATES PATENTS

| Number | Name | Date |
|---|---|---|
| 2,178,736 | Campbell | Nov. 7, 1939 |
| 2,207,775 | Bedford | July 16, 1940 |
| 2,219,729 | Tahon | Oct. 29, 1940 |
| 2,332,536 | Schlegel | Oct. 26, 1943 |
| 2,356,141 | Applegarth | Aug. 22, 1944 |
| 2,472,577 | Duke | June 7, 1949 |
| 2,495,511 | Dolberg | Jan. 24, 1950 |
| 2,498,839 | Hayward | Feb. 28, 1950 |
| 2,515,597 | Haantjes | July 18, 1950 |